(12) United States Patent
Burlingame

(10) Patent No.: US 6,601,450 B2
(45) Date of Patent: Aug. 5, 2003

(54) TWO AXIS OPEN LOOP GYROSCOPE

(75) Inventor: Roger F. Burlingame, Thousand Oaks, CA (US)

(73) Assignee: Litton Systems, Inc., Woodland Hills, CA (US)

(*) Notice: Subject to any disclaimer, the term of this patent is extended or adjusted under 35 U.S.C. 154(b) by 66 days.

(21) Appl. No.: 09/804,871

(22) Filed: Mar. 13, 2001

(65) Prior Publication Data

US 2002/0129651 A1 Sep. 19, 2002

(51) Int. Cl.[7] .................. G01C 19/00; G01P 15/08; G01P 3/44; G01P 9/00
(52) U.S. Cl. ................................ 73/504.08
(58) Field of Search .............. 73/504.11, 504.01, 73/504.08, 504.09

(56) References Cited

U.S. PATENT DOCUMENTS

| | | | | |
|---|---|---|---|---|
| 3,998,105 A | * | 12/1976 | Flusche | 73/504.11 |
| 4,269,072 A | * | 5/1981 | Duncan | 29/434 |
| 4,914,291 A | * | 4/1990 | Kan et al. | 250/227.29 |
| 5,138,883 A | * | 8/1992 | Paquet et al. | 73/504.18 |

* cited by examiner

Primary Examiner—Hezron Williams
Assistant Examiner—Tamiko D. Bellamy

(57) ABSTRACT

A gyroscope having a rotor mounted onto a rotating shaft wherein the rotor has a circular flange extending from and perpendicular to one surface thereof. A suspension member having a flexible flange is affixed concentric with the rotating shaft and the rotor. A hysteresis synchronous electric drive motor is used for spinning the combined shaft with rotor. A light source is disposed on a stationary plate for emitting light perpendicular to a surface of the circular flange of the rotor. A light sensor is also disposed on the stationary plate and on a side of the circular flange opposite of the light source for producing an electrical signal as a function of the amount of light received. The light source and the light sensor are positioned such that only a portion of the light from the source strikes the sensor when the gyro is in a quiescent rotating state. However, when the rotor is tilted as a function of an angular force applied to the gyroscope, the amount of light received by the sensor varies thereby producing an electrical signal indicative of the angular force.

20 Claims, 6 Drawing Sheets

TWO AXIS OPEN LOOP GYROSCOPE

BACKGROUND OF THE INVENTION

1. Field of the Invention

The present invention relates to gyroscopes, and in particular to an improved two-axis open loop "spinning mass" gyroscope capable of detecting angular input rates about two orthogonal axes without the use of slip rings.

2. Description of Related Art

Prior art gyroscopes that incorporate a gyroscopic element (flywheel) and a spin motor, typically incorporate piezoelectric crystals as pickoffs. When an angular motion is applied to the gyroscope the piezoelectric crystal is bent, which provides an electrical signal as a function of the bending. The electrical signal is then conducted through wires connected to the crystal and then through shaft-mounted slip rings for use: by external circuitry. These prior art devices require added machining features, and additional mounting components, such as the slip rings. Great care must be exercised during the assembly process. Moreover, output signals from the piezoelectric crystal pickoffs are highly susceptible to slip ring contamination, thereby significantly reducing the life of the gyroscope because of the slip ring wear.

U.S Pat. No. 4,715,227 discloses a gyroscope for detecting angular rates and linear accelerations by the use of a diamond-shaped piezoelectric crystal beam. This device suffers from the problems mentioned above when using piezoelectric crystals for pickoffs.

U.S Pat. No. 5,156,056 discloses a gyroscope having two specifically restrained piezoelectric crystals aligned perpendicular to the spin axis. This prior art device has the same problems as discussed above. That is, the use of piezoelectric crystals requiring slip rings.

Therefore a need exists for an improved two-axis gyroscope capable of detecting angular input rates about two orthogonal axes without the use of slip rings.

SUMMARY OF THE INVENTION

The present invention provides a simplified low-cost solution for applications requiring a two-axis gyroscope.

The present invention also provides an open loop device not requiring electromagnetic devices that provide torque.

The present invention also provides an open loop device not requiring wire wound coils and magnets.

A feature of the present invention is the provision of a simplified two-axis open loop gyroscope that can be built from commercially available LED's and optical detectors as rotor pickoffs, thereby eliminating the need for wire wound AC-excited coils and laminated iron cores.

An advantage of the present invention is the reduced number of component parts required to construct the gyroscope.

Another advantage of the present invention is the simplification of the electronics necessary for its operation.

Yet another advantage of the present invention is that by eliminating magnetic torquers and pickoffs, specialized magnetic steels and their associated heat treats can be replaced with lower cost rotor and housing materials, such as stainless steel.

These and other features and advantages of the present invention, which will become apparent as the invention is described in detail below. The invention is a gyroscope having a rotor mounted onto a rotating shaft. The rotor has a circular flange extending from and perpendicular to one surface thereof. A suspension member having a flexible flange is affixed concentric with the rotating shaft and the rotor. A hysteresis synchronous electric drive motor is used for spinning the combined shaft with rotor. A light source is disposed on a stationary plate for emitting light perpendicular to a surface of the circular flange of the rotor. A light sensor is also disposed on the stationary plate and on a side of the circular flange opposite of the light source for producing an electrical signal as a function of the amount of light received. The light source and the light sensor are positioned such that only a portion of the light from the source strikes the sensor when the gyro is in a quiescent rotating state. However, when the rotor is tilted as a function of an angular rotation rate applied to the gyroscope, the amount of light received by the sensor varies thereby producing an electrical signal indicative of the angular rotation rate.

Still other features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

The general purpose of this invention, as well as a preferred mode of use, its advantages and features will best be understood by reference to the following detailed description of an illustrative embodiment with reference to the accompanying drawings in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventors of carrying out his invention. Various modifications, however, will remain readily apparent to those skilled in the art, since the general principles of the present invention have been defined herein specifically to provide a two-axis, open loop, "spinning mass" gyroscope capable of detecting angular input.

Figure 1:
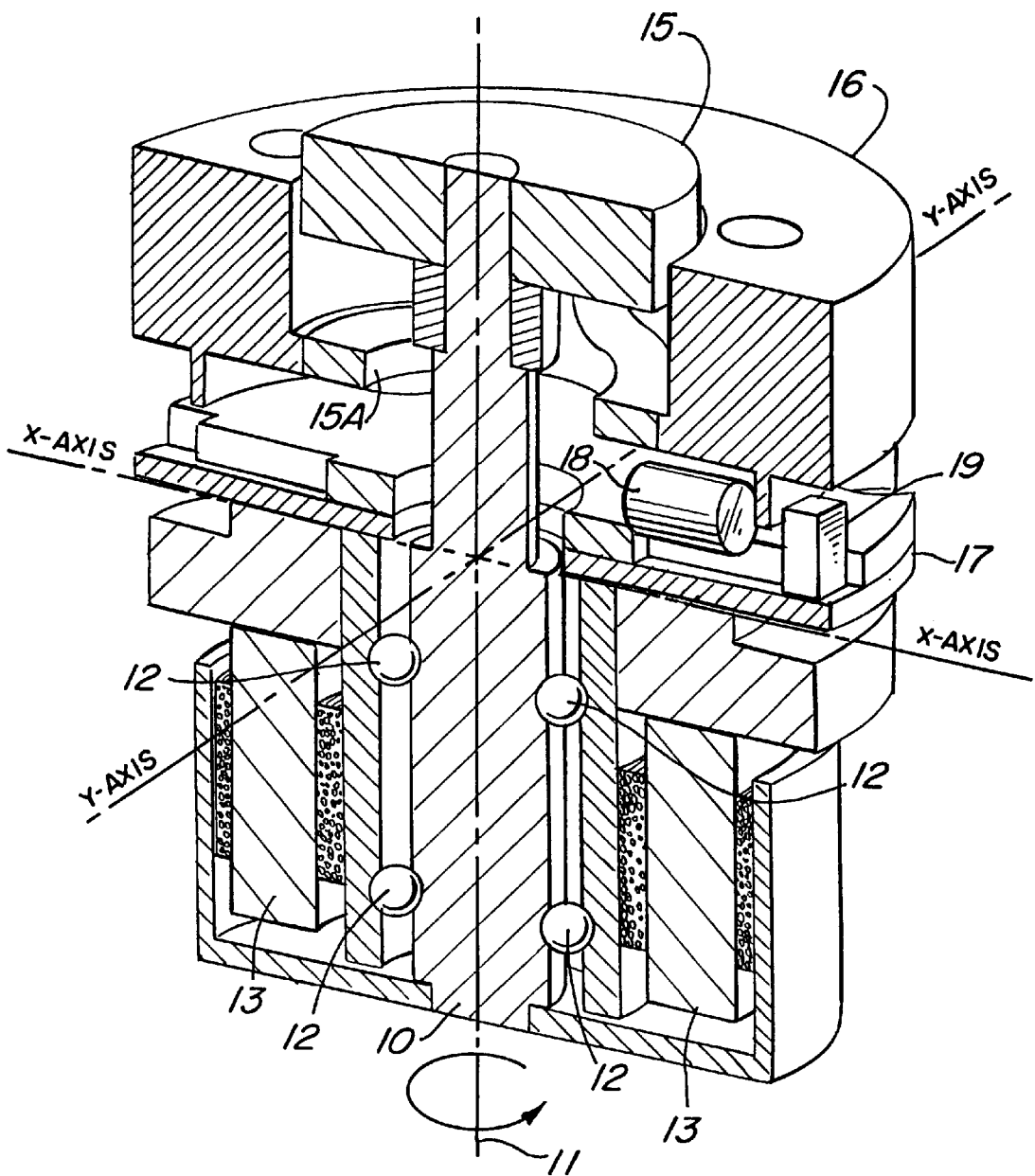
FIG. 1 illustrates a perspective view of the gyroscope of the present invention with a part cut away for viewing the interior thereof.

Referring now to FIG. 1, a perspective cut-away drawing illustrates the gyroscope built in accordance with the present invention. A shaft 10 has rotating freedom about a central or Z axis 11 and the shaft 10 rests on bearings 12. The shaft 10 is spun about the Z axis 11 by a synchronous hysteresis motor 13. Pressed onto an end of the shaft 10 opposite the motor 13 is a flexible suspension 15. The suspension 15 has a lower flange 15A with a slightly larger diameter than the top of the suspension. This lower flange 15A is press fitted inside the inner periphery of a rotor 16. Thus, the rotor 16 spins with the suspension 15 and is free to tilt from side to side, which will be elaborated upon hereinbelow.

Also shown in the cutaway view of FIG. 1 is a stationary plate 17 having mounted thereon a plurality of light emitting diodes ("LED") 18 and an equal number of photo detectors 19, or light sensors. The plate 17 is stationary and does not rotate with the shaft 10 and rotor 16. Details of the plate 17 are shown in FIG. 4 and will be amplified hereinbelow.

Figure 2:
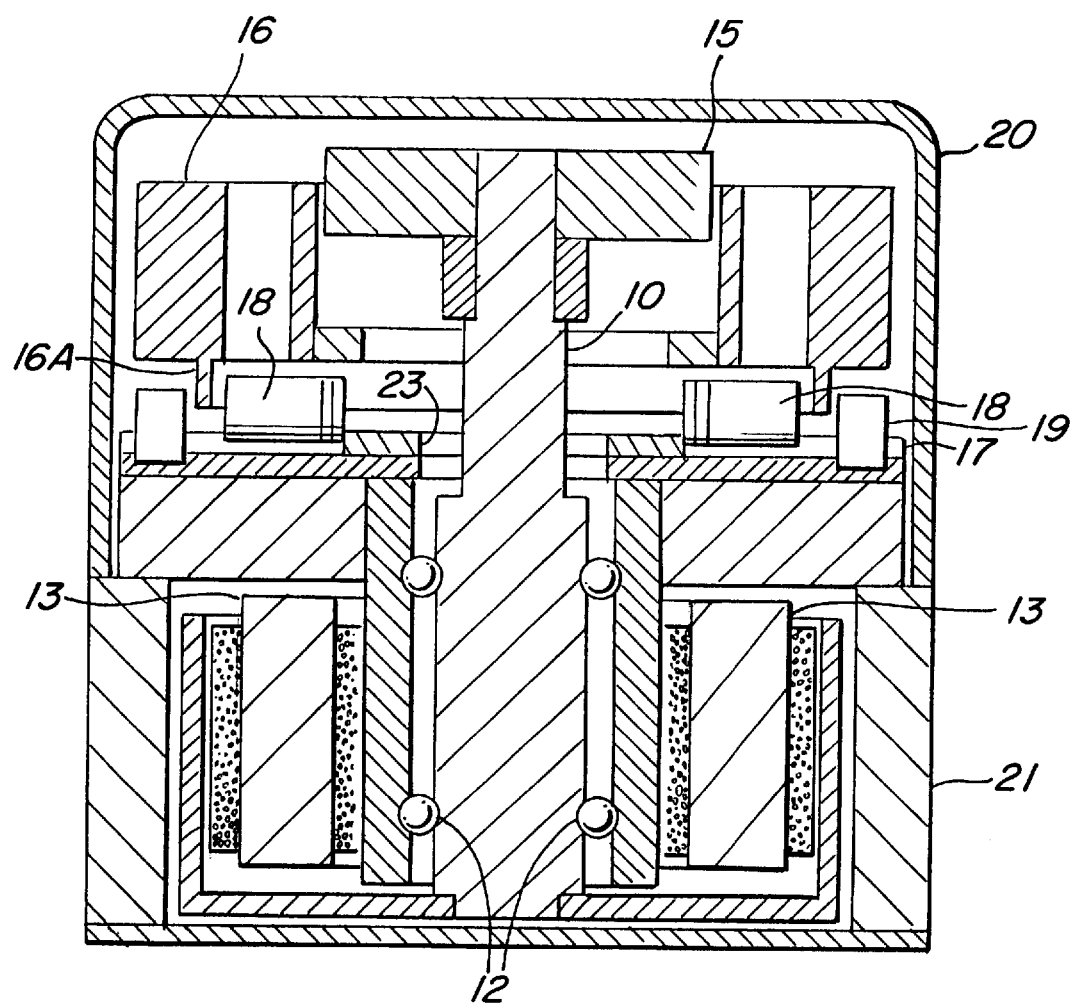
FIG. 2 is a cross-sectional view of the gyroscope built in accordance with the present invention.

Referring now to FIG. 2, a cross-section of the gyroscope according the present invention is shown. Like reference numerals represent like components. The rotor 16 includes a lower ringed flange 16A, which is perpendicular to and concentric with the rotor for intercepting a part of the light emitted from the LED's 18. 5 As will be illustrated in FIG. 5 and amplified hereinbelow, when the rotor 16 tilts, the amount of light passing from the LED's 18 to the detectors 19 will vary as a function of this tilt. The gyroscope is enclosed in a housing 20 and a base support 21.

Figure 3A:
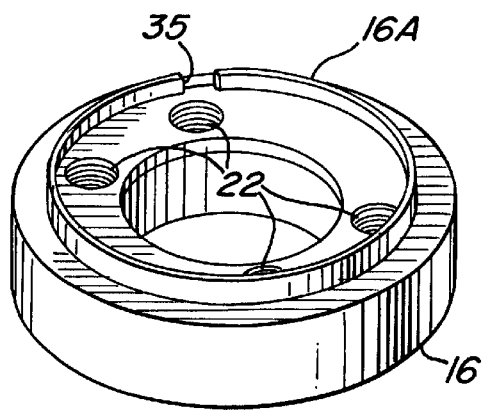
FIG. 3A is a perspective view of the rotor built in accordance with the present invent ion.
Figure 3B:
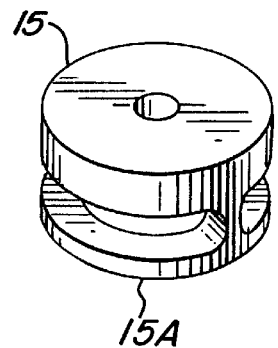
FIG. 3B is a perspective view of the suspension for holding the rotor to the main shaft.

Referring now to FIG. 3A, the rotor 16 is illustrated with greater detail. The rotor 16 can be machined from mild steel. In this view, the rotor 16 is shown upside down in order to illustrate the flange 16A having a notch 35 formed therein. The notch 35 is used for generating a reference strobe, and will be explained further hereinafter. Threaded openings 22 are made in the rotor 16 for use in balancing the rotor 16. Referring now to FIG. 3B, the suspension 15 is illustrated with greater detail. The suspension 15 includes a lower flange 15A, which forms two flexure blades that define a torsional axis which provides the rotor 16 a rotational degree of freedom about an axis perpendicular to the shaft axis 11. The flange 16A can be cut using a wire Electrical Discharge Machining (or "EDM") process, which can erode conductive metals, by electrical spark discharges.

Figure 4:
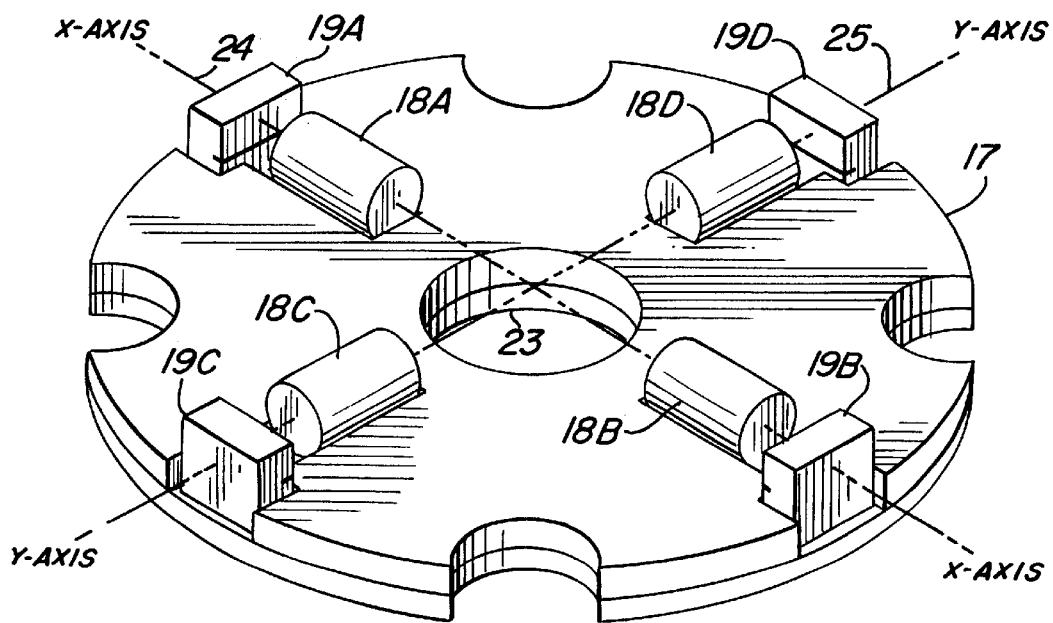
FIG. 4 is a perspective view of the optical pickoff stationary plate assembly.

Referring now to FIG. 4, the stationary plate 17 is shown with greater detail. The plate 17 includes a central opening 23, which is larger in diameter than the diameter of the shaft 10. The photo detectors 19, or sensors, are mounted on the periphery of the plate 17, and in the disclosed embodiment four such sensors are shown. Four LED's 18A, 18B, 18C, and 18D are mounted in axial alignment with each of the detectors 19A, 19B, 19C, and 19D, respectively; but, they are spaced a short distance diametrically inward from the detectors. In particular, LED's 18A and 18B and concomitant detectors 19A and 19B are aligned on the X axis 24; and LED's 18C and 18D and concomitant detectors 19C and 19D are aligned on the Y axis 25. Note the gap between the LED 18A and the detector 19A, which gap is considerably wider than the thickness of the flange 16A so as to allow for any tilting movement of the rotor 16, as will be explained hereinafter. Similar gaps are provided between the remaining LED's and their concomitant detectors. In other embodiments of the invention a minimum of one LED and one optical detector are desired for both pickoff axes.

Figure 5:
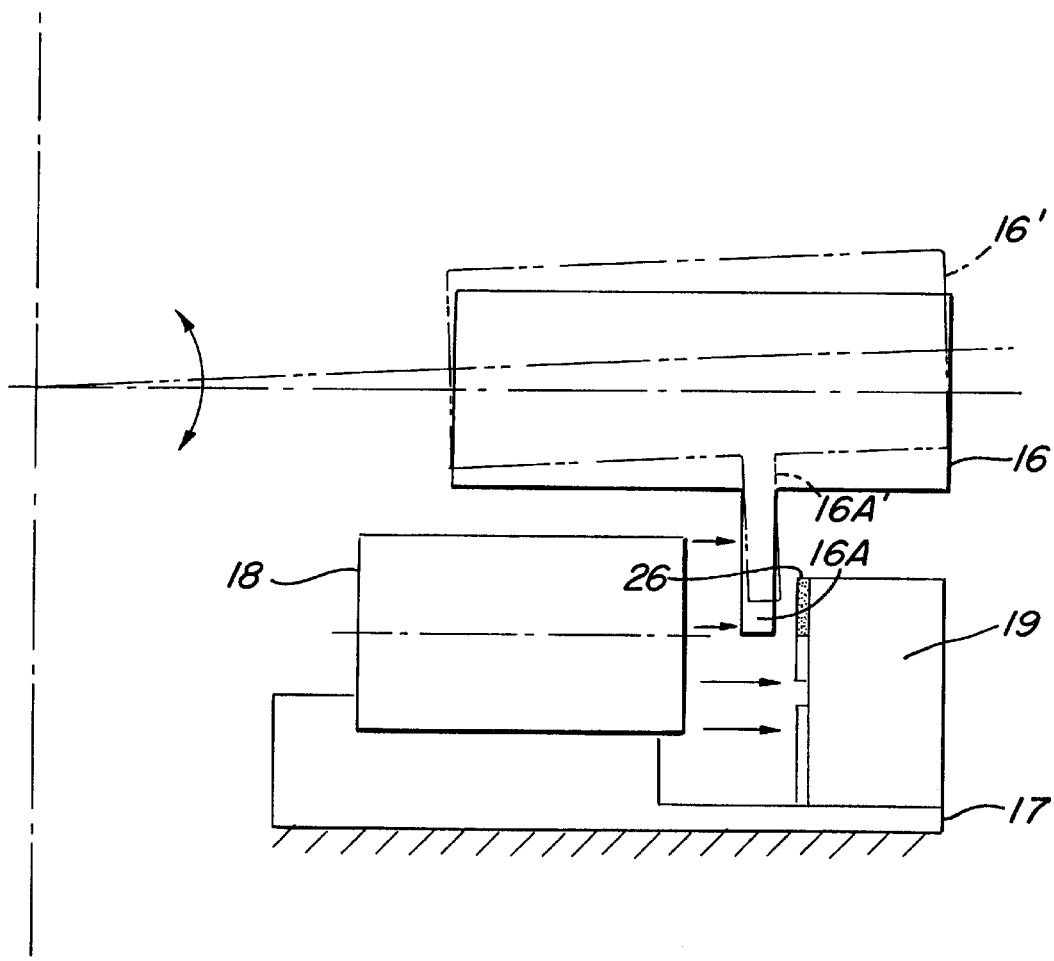
FIG. 5 is a cross-sectional detail showing mechanical operation of the present invention.

Referring now to FIG. 5, details of the relationship between the LED 18, photo detectors 19 and the rotor flange 16A are illustrated. In a quiescent state, i.e., the rotor 16 is spinning and no external rotation rates being applied to the gyroscope, light is transmitted from the LED 18 to the detector 19 as depicted by the arrows in FIG. 5. As a result of the proximity of the flange 16A, only a portion of the light from the LED 18 is received by the detector 19. In other words, part of the light from the LED 18 is shaded by the flange 16A as depicted by a rotor shadow mask 26 in FIG. 5.

When an external rotational input rate is applied to the gyroscope, the rotor 16 tilts to a position. 16' and the flange 16A tilts to a position 16A'. This allows more light to pass from the LED 18 to the detector 19, which change in light intensity is sensed as movement of the gyroscope. This will be illustrated in greater detail in FIG. 6 and explained further hereinbelow.

Figure 6:
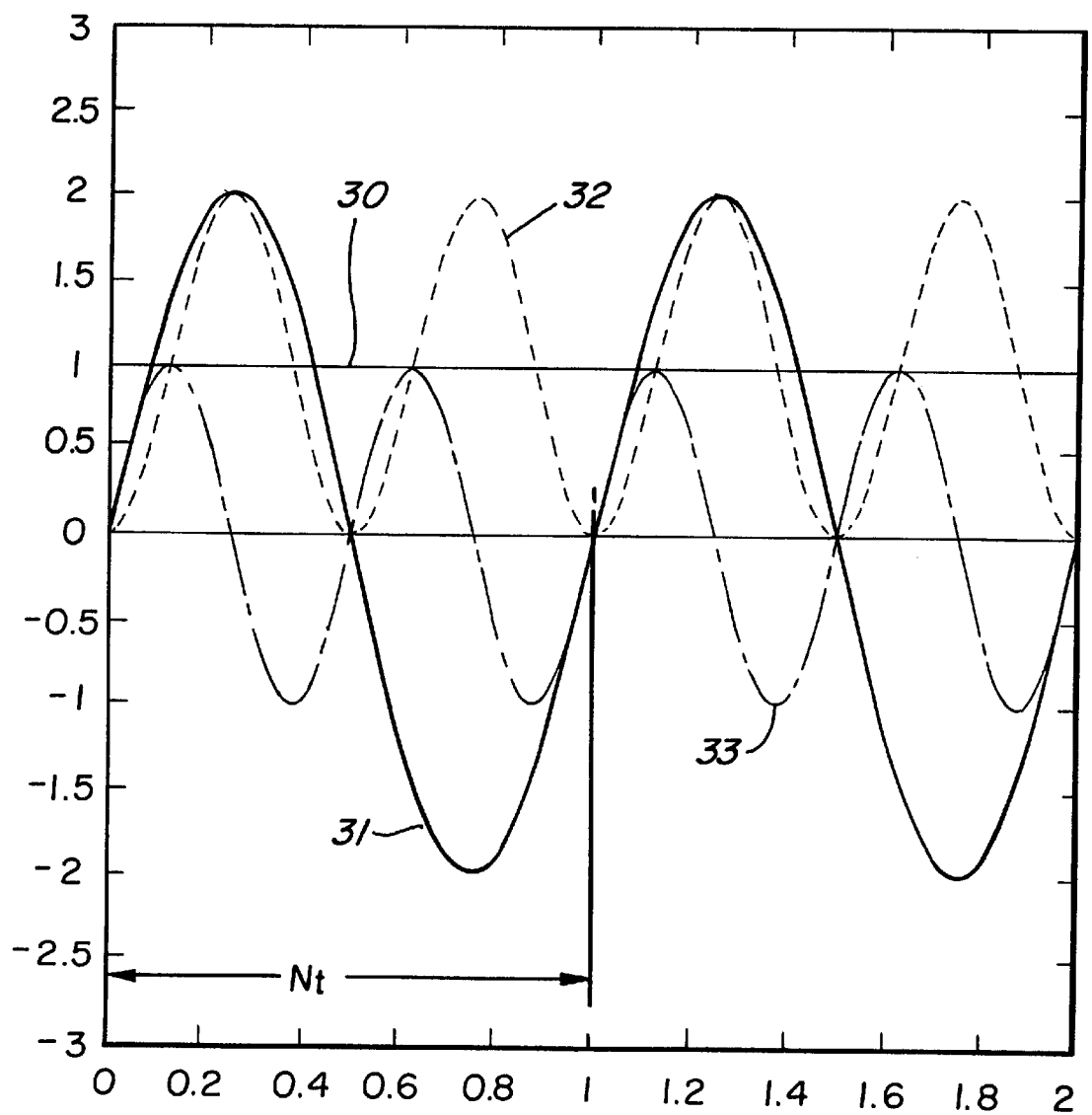
FIG. 6 is a waveform diagram illustrating electrical operation of the present invention.

As an example, Referring now to FIG. 6, optical detector output waveforms from the gyroscope are shown during a constant angular input rate about the X-case gyro axis. As alluded to hereinabove with reference to FIG. 5, a DC current to the LED 18 generates a constant source of emitted light that impinges upon the optical dector The detector DC current output will vary with the amount of incident light. Angular motion of the gyroscope (including the rotor 16) due to a case input rate causes the rotor shadow mask 26 to vary the amount of illumination upon the optical detector 19. The result is a detector DC current output that is proportional to the case input rate. This DC current output is shown in FIG. 6 as horizontal line 30. Waveform 31, or θ, is the rotor motion during an applied case input rate, as seen by a shaft (rotating) fixed observer. The frequency of waveform 31 is the same as the shaft spin, or IN. As an example, An input about the X-case axis causes a Y-case pickoff output signal (waveform 32), which includes a DC component plus a"2N" AC component. In addition, an X-case pickoff output signal (waveform 33) is a"2N" AC component that is phase shifted 90° from the Y-case pickoff AC component. From the foregoing and FIG. 6, it can be appreciated that there are at least two possible methods for obtaining a useful pickoff signal.

A first of these two methods is to measure the DC component of the output signal (i.e., the Y-pickoff for a X-case input rate and the X-pickoff for a Y-case input rate) while filtering and rejecting the 2N AC component. This method simplifies the pickoff processing electronics by eliminating the need for pickoff demodulation. This method requires a minimum of two optical pickoffs, one located along the X case axis and another along the Y case axis.

A second method for obtaining a useful pickoff signal requires only one pickoff, which can be located along either the X or the Y case axis. The AC output of the pickoff is.proportional to angular input rate components of the X and Y case axes. This AC output from the pickoff is demodulated using both 2N SINE and 2N COSINE demodulation reference signals. A shaft speed detector may be used to generate the 2N SINE and 2N COSINE reference signals. The resulting two demodulated output signals, representing the angular input rate components of the gyro X and Y case axes, are filtered to obtain DC output components. These DC components are proportional to the gyro angular input rate components.

Figures 7A, 7B:
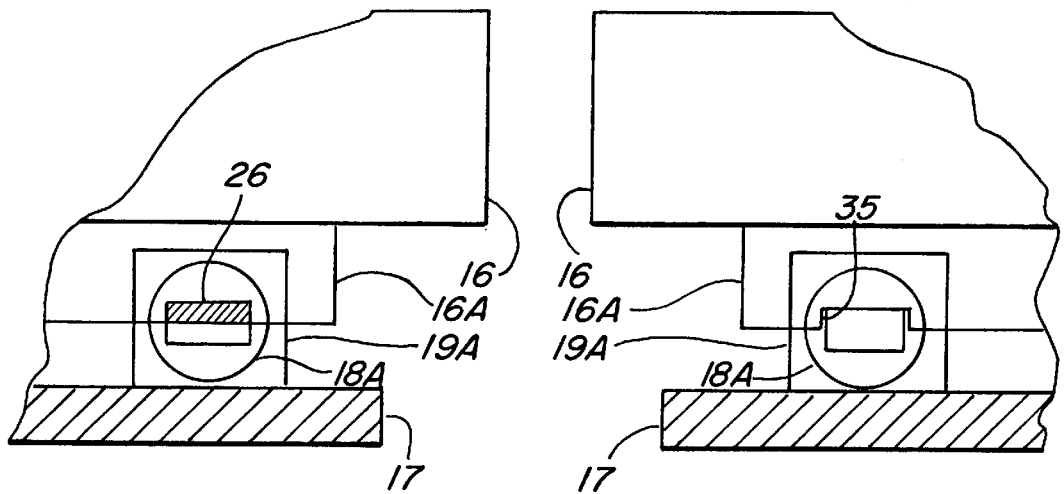
FIGS. 7A and 7B illustrate details of the flange, LED's and photo sensors.

Referring now to FIG. 7A, a detail of a portion of the rotor 16 with flange 16A, LED 18A and photo sensor 19A mounted on the stationary plate 17 is shown in a cut-away view. This drawing shows the shadow 26 on the photo sensor 18 caused by the flange 16A in a quiescent state. FIG. 7B illustrates the same components, but with the reference notch 35 exposing all the light from the LED 18A onto the detector 19A.

Figure 8:
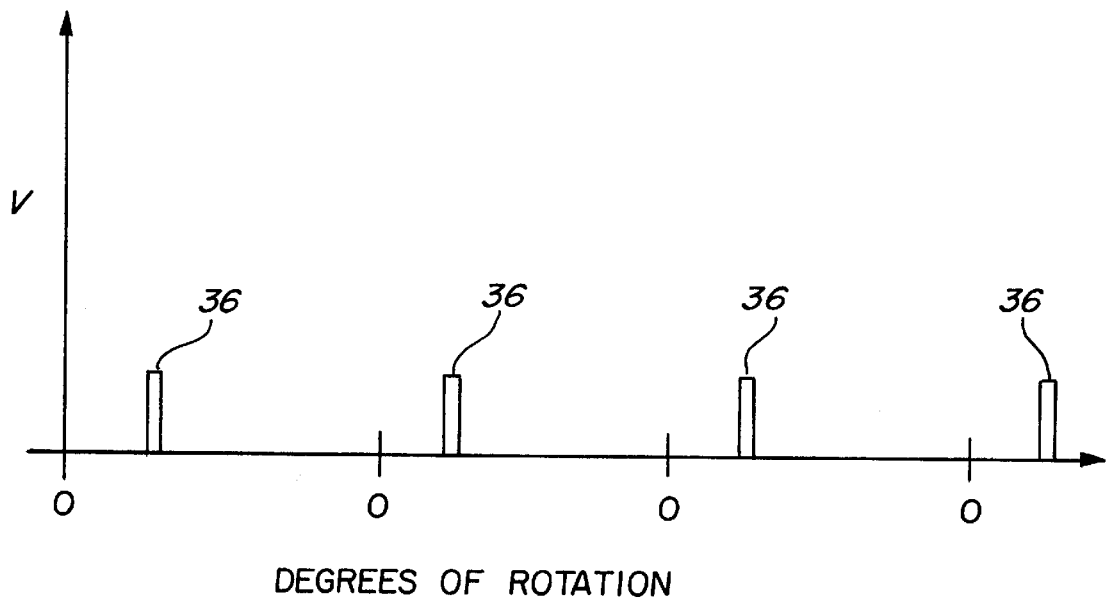
FIG. 8 is a plot of reference pulses generated by the reference strobe.

Referring now to FIG. 8, a timing diagram illustrates a reference strobe 36, which comprises a single pulse for each revolution of the rotor 16. This reference strobe 36 is used for generating sine and cosine reference waveforms, which is used in the demodulation process described hereinabove.

While the invention has been particularly shown and described with reference to a preferred embodiment, it will be understood by those skilled in the art that various changes in form and detail may be made therein without departing from the spirit and scope of the invention.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A gyroscope comprising:
   a. a rotor mounted on a rotating shaft and having a circular flange on one surface thereof;
   b. a suspension member having a flexible flange concentric with and affixed to said rotating shaft and said rotor;
   c. a device for spinning said shaft and rotor;
   d. a light source disposed on a stationary plate for emitting light substantially perpendicular to a surface of said circular flange; and,
   e. a light sensor disposed on said stationary plate and on a side of said circular flange opposite of said light source for producing an electrical signal as a function of the amount of light received, said light source and said light sensor positioned such that the light received being representative of angular rotation rate being applied to said gyroscope.

2. The gyroscope as in claim 1 wherein said circular flange on said one surface of said rotor is one continuous circular band extending from and perpendicular to said one surface of said rotor.

3. The gyroscope as in claim 1 wherein said suspension member is formed from one piece of metal.

4. The gyroscope as in claim 1 wherein said flexible flange is adapted to allow said rotor to tilt when an angular rotation rate is applied to said gyroscope.

5. The gyroscope as in claim 1 a device for spinning said shaft and rotor comprises an electric drive motor wherein said motor is a hysteresis synchronous motor.

6. The gyroscope as in claim 1 wherein said light source disposed on a stationary plate for emitting light perpendicular to a surface of said circular flange of said rotor is at least one light emitting diode and one concomitant light sensor.

7. The gyroscope as in claim 6 wherein said light source includes four light emitting diodes and wherein each light emitting diode is in alignment with each of said sensors.

8. The gyroscope as in claim 1 wherein said rotor is formed from molded steel.

9. The gyroscope as in claim 1 wherein said rotor is machined from steel.

10. A gyroscope including an electric motor for spinning a shaft having mounted thereon a rotor, said gyroscope comprising:
   a. said rotor having a circular flange extending from and perpendicular to one surface thereof;
   b. a suspension member having a flexible flange concentric with and affixed to said rotor;
   c. a light source disposed on a stationary plate for emitting light perpendicular to a surface of said circular flange of said rotor; and,
   d. a light sensor also disposed on said stationary plate and on a side of said circular flange opposite of said light source for producing an electrical signal as a function of the amount of light received, said light source and said light sensor positioned such that only a portion of the light from said source strikes said sensor when said gyro is in a quiescent rotating state.

11. The gyroscope as in claim 10 wherein said flexible flange is adapted to allow said rotor to tilt when an angular force is applied to said gyroscope.

12. The gyroscope as in claim 10 wherein said light source disposed on a stationary plate for emitting light perpendicular to a surface of said circular flange of said rotor is at least one light emitting diode for each pickoff axis.

13. The gyroscope as in claim 10 wherein said light source includes four light emitting diodes wherein each light emitting diode is in alignment with each of said sensors.

14. The gyroscope as in claim 10 wherein the flexible flange of said suspension member is suspended from the body of said member at only two points on the periphery thereof whereby said suspension member is free to bend in two directions.

15. The gyroscope as in claim 10 wherein a direct current is produced by said sensors when said gyroscope is operation without any angular force applied thereto.

16. The gyroscope as in claim 10 wherein a sinusoidal waveform is produced in response to an angular force applied to said gyroscope.

17. An improved gyroscope including an electric motor for spinning a shaft having mounted thereon a rotor, said gyroscope comprising:
   said rotor having a circular flange extending from and perpendicular to one surface thereof and having a notch therein;
   a suspension member having a flexible flange concentric with and affixed to said rotor;
   a light source disposed on a stationary plate for emitting light perpendicular to a surface of said circular flange of said rotor; and,
   a light sensor also disposed on said stationary plate and on a side of said circular flange opposite of said light source for producing an electrical signal as a function of the amount of light received, said light source and said light sensor positioned such that only a portion of the light from said source strikes said sensor when said gyro is in a quiescent rotating state; and,
   said light sensor also producing a reference frequency signal in response to light from said light source passing through said notch in said circular flange during each revolution thereof.

18. The gyroscope as in claim 17 further including a demodulator for demodulating said electrical signal.

19. The gyroscope as in claim 18 wherein said reference frequency signal is used in synchronizing operation of said demodulator.

20. The gyroscope as in claim 17 wherein said suspension member flexible flange is adapted to allow said rotor to tilt when an angular force is applied to said gyroscope.

* * * * *

(12) EX PARTE REEXAMINATION CERTIFICATE (6077th)
United States Patent
Burlingame

(10) Number: US 6,601,450 C1
(45) Certificate Issued: Jan. 1, 2008

(54) TWO AXIS OPEN LOOP GYROSCOPE

(75) Inventor: Roger F. Burlingame, Thousand Oaks, CA (US)

(73) Assignee: Litton Systems, Inc., Woodland Hills, CA (US)

Reexamination Request:
No. 90/007,456, Mar. 8, 2005

Reexamination Certificate for:
Patent No.: 6,601,450
Issued: Aug. 5, 2003
Appl. No.: 09/804,871
Filed: Mar. 13, 2001

(51) Int. Cl.
*G01C 19/00* (2006.01)
*G01P 15/08* (2006.01)
*G01P 3/44* (2006.01)
*G01P 9/02* (2006.01)

(52) U.S. Cl. ................... 73/504.08; 73/504.11
(58) Field of Classification Search ........ 73/504.08, 73/504.09, 504.11; 250/231.12; 74/5, 6 A
See application file for complete search history.

(56) References Cited

U.S. PATENT DOCUMENTS 4,930,365 A * 6/1990 Porat et al. ......... 250/231.12
5,142,485 A * 8/1992 Rosenberg et al. ......... 73/510
5,621,207 A * 4/1997 O'Mara ................. 250/231.1

FOREIGN PATENT DOCUMENTS

EP 0 457 083 11/1991

* cited by examiner

*Primary Examiner*—John E. Chapman

(57) ABSTRACT

A gyroscope having a rotor mounted onto a rotating shaft wherein the rotor has a circular flange extending from and perpendicular to one surface thereof. A suspension member having a flexible flange is affixed concentric with the rotating shaft and the rotor. A hysteresis synchronous electric drive motor is used for spinning the combined shaft with rotor. A light source is disposed on a stationary plate for emitting light perpendicular to a surface of the circular flange of the rotor. A light sensor is also disposed on the stationary plate and on a side of the circular flange opposite of the light source for producing an electrical signal as a function of the amount of light received. The light source and the light sensor are positioned such that only a portion of the light from the source strikes the sensor when the gyro is in a quiescent rotating state. However, when the rotor is tilted as a function of an angular force applied to the gyroscope, the amount of light received by the sensor varies thereby producing an electrical signal indicative of the angular force.

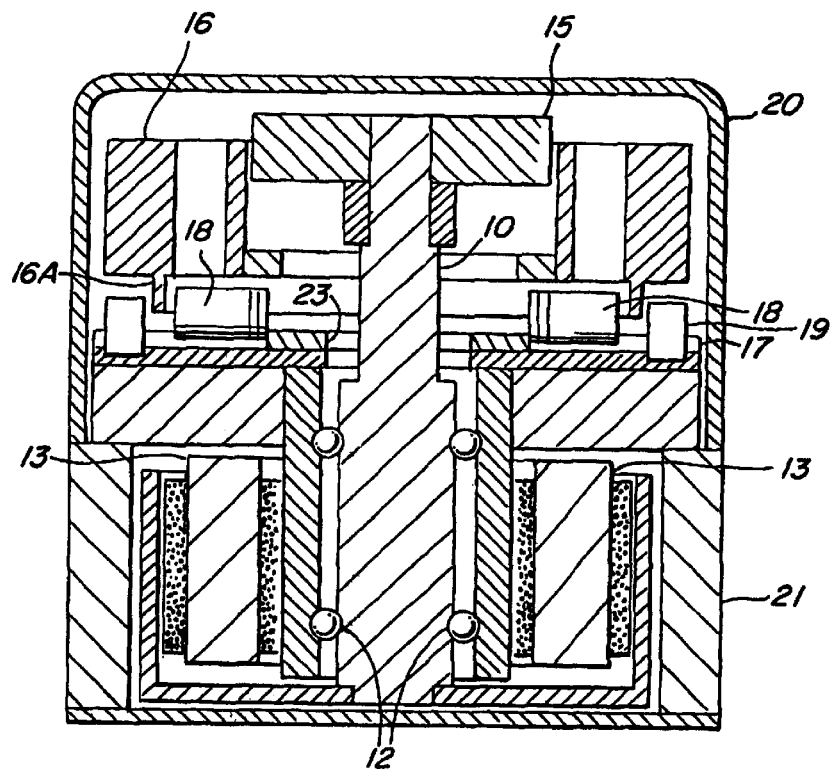

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7–20 are cancelled.

Claims 1–6 are determined to be patentable as amended.

New claims 21 and 22 are added and determined to be patentable.

1. A gyroscope comprising:
 [a.] a rotor (16) mounted on a rotating shaft (10) and having a circular flange (16A) on one surface thereof;
 [b.] a suspension member (15) having a flexible flange (15A) concentric with and affixed to said rotating shaft (10) and said rotor (16);
 [c.] a device (13) for spinning said shaft and rotor;
 [d.] a *first* light source (18C) disposed on a stationary plate (17) for emitting light substantially perpendicular to a surface of said circular flange (16A);
 [e.] a *first* light sensor (19C) disposed on [said] *the* stationary plate (17) and on a side of [said] *the* circular flange (16A) opposite [of said] *the first* light source (18C) for producing an electrical signal as a function of the amount of light received;
 *a second light source (18D) disposed on the stationary plate (17) in alignment with the first light source (18C) on a side of the shaft (10) opposite the first light source (18C); and*
 *a second light sensor (19D) disposed on the stationary plate (17) and on a side of the circular flange (16A) opposite the second light source (18D) for producing an electrical signal as a function of the amount of light received;*
 wherein said *first and second* light [source] *sources* and said *first and second* light [sensor] *sensors* are positioned such that the light received being representative of angular rotation rate being applied to said gyroscope.

2. The gyroscope as in claim 1 wherein said circular flange (16A) on said one surface of said rotor (16) is one continuous circular band extending from and perpendicular to said one surface of said rotor (16).

3. The gyroscope as in claim 1 *or claim 2* wherein said suspension member (15) is formed from one piece of metal.

4. The gyroscope as in claim 1 *or claim 2* wherein said flexible flange (15A) is adapted to allow said rotor (16) to tilt when an angular rotation rate is applied to said gyroscope.

5. The gyroscope as in claim 1 [a] *or claim 2 wherein said device for spinning said shaft and rotor* [comprises an electric drive motor wherein said motor] is a hysteresis synchronous motor.

6. The gyroscope as in claim 1 *or claim 2* wherein said *first (18C) and second (18D)* light source [disposed on a stationary plate for emitting light perpendicular to a surface of said circular flange of said rotor is at least one] *is a* light emitting diode [and one concomitant light sensor].

*21. The gyroscope as in claim 1 or claim 2 wherein the circular flange (16A) has a notch (35) therein.*

*22. The gyroscope as in claim 1 further comprising:*
 *a third light source (18A) disposed on the stationary plate (17) at a ninety-degree angle from the first (18C) and second (18D) light source for emitting light substantially perpendicular to a surface of the circular flange (16A);*
 *a third light sensor (19A) disposed on the stationary plate (17) and on a side of the circular flange (16A) opposite the third light source (18A) for producing an electrical signal as a function of the amount of light received;*
 *a fourth light source (18B) disposed on the stationary plate 17 in alignment with the third light source (18A) on a side of the shaft (10) opposite the third light source (18A); and*
 *a fourth light sensor (19B) disposed on the stationary plate (17) and on a side of the circular flange (16A) opposite the fourth light source (18B) for producing an electrical signal as a function of the amount of light received.*

* * * * *